US011457181B1

(12) United States Patent
Itoh

(10) Patent No.: US 11,457,181 B1
(45) Date of Patent: Sep. 27, 2022

(54) VEHICLE MANEUVER ASSIST WITH ENVIRONMENT-FIXED OVERHEAD COMPOSITE IMAGE

(71) Applicants: DENSO International America, Inc., Southfield, MI (US); Denso Corporation, Kariya (JP)

(72) Inventor: Arata Itoh, Southfield, MI (US)

(73) Assignees: DENSO INTERNATIONAL AMERICA, INC., Southfield, MI (US); DENSO CORPORATION

( * ) Notice: Subject to any disclaimer, the term of this patent is extended or adjusted under 35 U.S.C. 154(b) by 0 days.

(21) Appl. No.: 17/206,325

(22) Filed: Mar. 19, 2021

(51) Int. Cl.
| | |
|---|---|
| *H04N 7/18* | (2006.01) |
| *G06T 7/70* | (2017.01) |
| *H04N 5/247* | (2006.01) |
| *H04N 5/265* | (2006.01) |
| *G06T 7/50* | (2017.01) |
| *B60R 1/00* | (2022.01) |

(52) U.S. Cl.
CPC ............... *H04N 7/181* (2013.01); *B60R 1/00* (2013.01); *G06T 7/50* (2017.01); *G06T 7/70* (2017.01); *H04N 5/247* (2013.01); *H04N 5/265* (2013.01); *B60R 2300/105* (2013.01); *B60R 2300/303* (2013.01); *B60R 2300/607* (2013.01); *B60R 2300/808* (2013.01); *G06T 2207/30252* (2013.01)

(58) Field of Classification Search
CPC ........ B60R 2300/607; B60R 2300/808; G06T 2207/30252
See application file for complete search history.

(56) References Cited

U.S. PATENT DOCUMENTS

| | | | |
|---|---|---|---|
| 6,970,184 B2 | 11/2005 | Hirama et al. | |
| 8,446,471 B2 | 5/2013 | Wu et al. | |
| 9,446,713 B2 | 9/2016 | Lu et al. | |
| 9,469,250 B2 | 10/2016 | Lynam | |
| 9,620,009 B2 * | 4/2017 | Hayasaka | G08G 1/166 |
| 10,200,656 B2 * | 2/2019 | Lee | B60R 1/00 |
| 10,384,612 B2 | 8/2019 | Bochenek | |
| 10,532,698 B2 | 1/2020 | Potnis et al. | |
| 10,596,967 B2 | 3/2020 | Weigert et al. | |
| 10,710,505 B2 * | 7/2020 | Asayama | B60R 1/00 |
| 2011/0210868 A1 * | 9/2011 | Yano | B62D 15/027 340/932.2 |

(Continued)

FOREIGN PATENT DOCUMENTS

JP 2007183877 A * 7/2007

*Primary Examiner* — Boubacar Abdou Tchoussou
(74) *Attorney, Agent, or Firm* — Dickinson Wright PPLC

(57) ABSTRACT

Systems and methods for assisting drivers to maneuver a vehicle include a plurality of image sensors about a vehicle capture image data. At least one processor is programmed to display one or more types of overhead views on a vehicle display based on the image data. For example, an environment-fixed overhead composite image can be displayed on the vehicle display. In the environment-fixed overhead composite image, an environment about the vehicle is displayed spatially fixed as the vehicle is maneuvered, and a graphical image representing the vehicle moves within the environment-fixed overhead composite image as the vehicle maneuvered. This type of overhead view can be shown when, for example, distance between the vehicle and a target object is below a threshold.

15 Claims, 5 Drawing Sheets

(56) References Cited

U.S. PATENT DOCUMENTS

| | | | | |
|---|---|---|---|---|
| 2016/0321920 | A1* | 11/2016 | Hayasaka | G08G 1/052 |
| 2017/0054946 | A1* | 2/2017 | Lee | H04N 7/18 |
| 2019/0045092 | A1 | 2/2019 | Kitani | |
| 2019/0084477 | A1 | 3/2019 | Gomez-Mendoza et al. | |
| 2019/0100144 | A1* | 4/2019 | Asayama | G06K 9/00805 |

* cited by examiner

VEHICLE MANEUVER ASSIST WITH ENVIRONMENT-FIXED OVERHEAD COMPOSITE IMAGE

TECHNICAL FIELD

The present disclosure relates to systems and method for assisting a driver with maneuvering a vehicle utilizing an environment-fixed overhead composite image.

BACKGROUND

Many automotive vehicles include a rear-facing camera. This rear-facing camera can assist the driver when the driver has shifted the vehicle into Reverse gear, or when parking, for example. In particular, an image of the environment behind the vehicle can be displayed on a vehicle display. Some automotive vehicles have multiple cameras at various locations about the vehicle. These cameras can be used for, among other things, creating a bird's eye view of the environment about the vehicle. This bird's eye view can also be displayed on the vehicle display for assisting the driver in maneuvering the vehicle.

SUMMARY

In an embodiment, a system for assisting a driver to maneuver a vehicle is provided. The system includes a plurality of image sensors configured to mount at various locations about a vehicle, wherein at least some of the image sensors are cameras, and wherein the image sensors are configured to output image data. The system also includes a vehicle display, and at least one processor. The at least one processor is programmed to: (i) receive image data from the cameras, (ii) utilize a first of the image sensors to determine a distance between the first of the image sensors and a target object external to the vehicle, (iii) generate an environment-fixed overhead composite image on the vehicle display representing a first overhead view of an environment about the vehicle wherein the environment displayed on the vehicle display is spatially fixed as the vehicle is maneuvered and a graphical image representing the vehicle is configured to move within the environment-fixed overhead composite image as the vehicle maneuvered, (iv) generate a vehicle-fixed overhead composite image on the vehicle display representing a second overhead view of the environment about the vehicle wherein the environment displayed on the vehicle display is spatially moveable as the vehicle is maneuvered and the graphical image representing the vehicle is fixed within the vehicle-fixed overhead composite image as the vehicle is maneuvered, and (v) switch the vehicle display between displaying the vehicle-fixed overhead composite image and the environment-fixed overhead composite image based on the distance.

In another embodiment, a system for assisting a driver to maneuver a vehicle includes a plurality of image sensors configured to mount at various locations about a vehicle, wherein at least some of the image sensors are cameras, and wherein the image sensors are configured to output image data. The system also includes a vehicle display and at least one processor. The at least one processor is configured to (i) receive image data from the cameras, (ii) utilize a first of the image sensors to determine a distance between the first of the image sensors and a target object external to the vehicle, and (iii) in response to the distance being less than a threshold, utilize the image data to generate an environment-fixed overhead composite image on the vehicle display representing an overhead view of an environment about the vehicle wherein the environment displayed within the environment-fixed overhead composite image is spatially fixed as the vehicle is maneuvered and a graphical image representing the vehicle is configured to move within the environment-fixed overhead composite image as the vehicle maneuvered.

In an embodiment, a method of assisting a driver to maneuver a vehicle is provided. The method includes receiving image data from a plurality of image sensors mounted about a vehicle, wherein at least some of the image sensors are cameras. The method also includes generating, based on the image data, an environment-fixed overhead composite image on a vehicle display representing an overhead view of an environment about the vehicle, wherein within the environment-fixed overhead composite image the environment is spatially fixed as the vehicle is maneuvered and a graphical image representing the vehicle is configured to move within the environment-fixed overhead composite image as the vehicle maneuvered.

DETAILED DESCRIPTION

Figure 1:
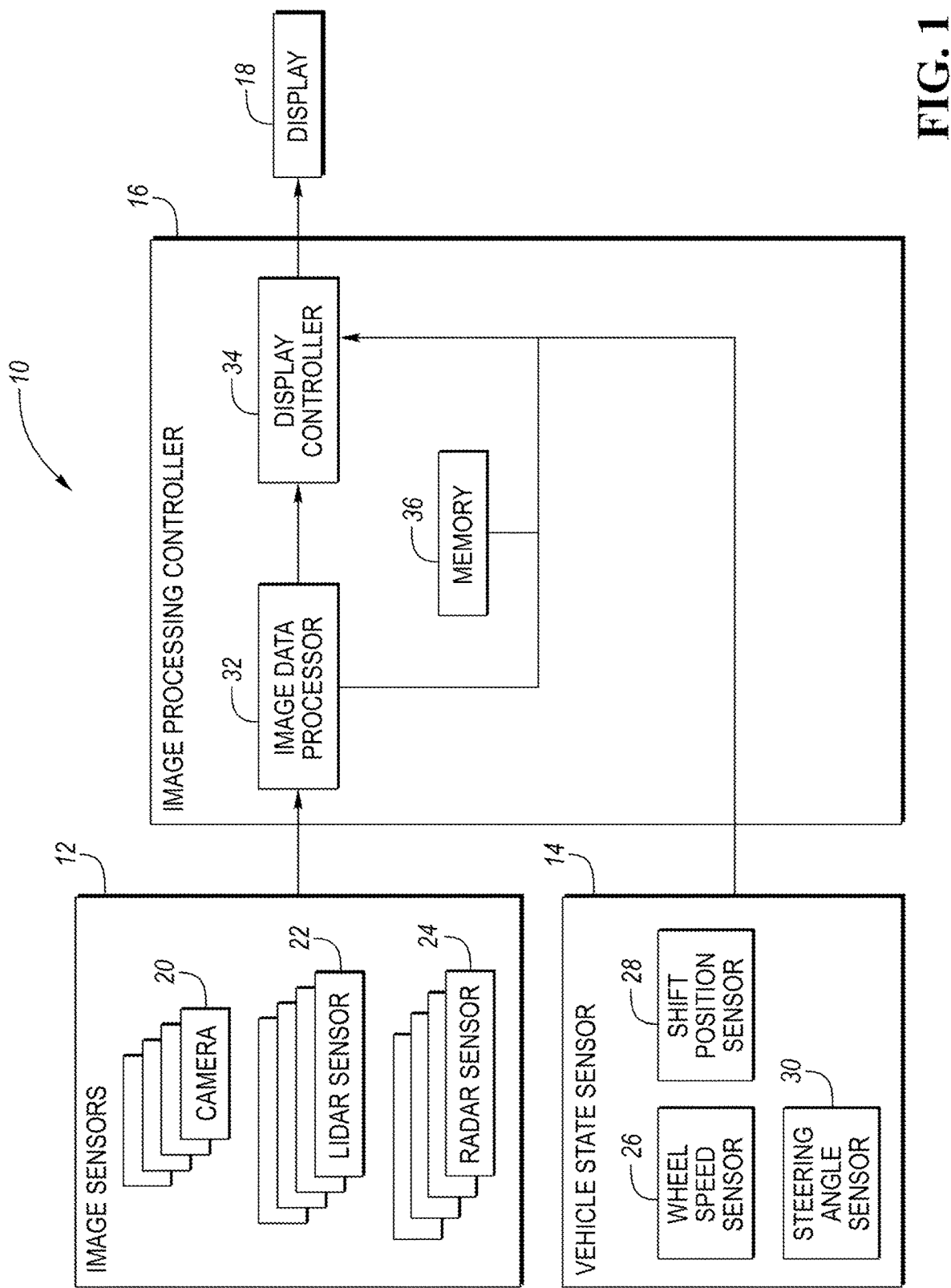
FIG. 1 is a schematic of a system for assisting a driver to maneuver a vehicle, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

It is common in some automotive vehicles (e.g., cars, vans, trucks, sports-utility vehicles (SUVs), etc.) to include a rear-facing camera. This rear-facing camera can assist the driver when the driver has shifted the vehicle into Reverse gear, or when parking. In particular, an image of the environment behind the vehicle can be displayed on a vehicle display (e.g., an infotainment screen or center console display). It is also common in some vehicles to include a plurality of cameras about the vehicle that can collectively create a bird's eye view (overhead view) of the vehicle on the vehicle display. The images from the multiple cameras are stitched together to create a 360-degree view of the environment about the vehicle, shown on the vehicle display as if a virtual camera were located above the vehicle. An image representing a top view of the vehicle can be overlaid onto the view shown on the vehicle display. This is referred to herein as a vehicle-fixed overhead composite image, as the image representing the vehicle remains at a fixed location on the vehicle display as the driver maneuvers the vehicle, and the environment about the vehicle as detected by the cameras moves as the driver maneuvers the vehicle. These camera systems can help a user reverse the vehicle or park the vehicle in tight spaces.

Even with these camera systems, some driving tasks remain difficult for many drivers. For example, reversing the vehicle to back up in alignment with a trailer to attach the vehicle to a trailer hitch can remain very difficult for many drivers. Even when using a vehicle-fixed overhead composite image shown on the vehicle display, it is oftentimes hard to judge alignment between the vehicle and the trailer due to the environment moving as the vehicle is maneuvering.

Therefore, according to various embodiments described herein, a system for assisting a driver to maneuver a vehicle includes an environment-fixed overhead composite image being displayed on the vehicle display. In this system, cameras (and other optional image sensors) are used to create the environment-fixed overhead composite image in which, as the driver maneuvers the vehicle, the environment about the vehicle as detected by the cameras remains stationary and an image representing a top view of the vehicle moves as the vehicle moves. By keeping the environment (e.g., the road) stationary on the vehicle display as the driver maneuvers the vehicle, the driver can gain a better perspective of how the vehicle's alignment with respect to certain objects (e.g., a trailer) changes during the maneuvering.

FIG. 1 illustrates a system 10 for assisting a driver to maneuver a vehicle, according to one embodiment. In general, the system 10 includes a plurality of image sensors 12, a plurality of vehicle state sensors 14, an image processing controller 16, and a vehicle display 18. The image sensors 12 and the vehicle state sensors 14 are electrically connected to the image processing controller 16 and are inputs thereto. The image processing controller 16 processes the data from these sensors, and causes the vehicle display 18 to display a view and/or information based on the input from the sensors 12, 14.

The image sensors 12 can include one or more different types of sensors, and can be configured to detect an environment about the vehicle. The image sensors 12 may therefore also be referred to as environmental sensors. The image sensors 12 may include one or more cameras 20, one or more light detecting and ranging (LIDAR) sensors 22, and/or one or more radio detecting and ranging (RADAR) sensors 24. While not illustrated, in other embodiments the image sensors 12 include one or more sound navigation and ranging (SONAR) sensors, or other types of environmental sensors configured to detect an environment outside of the vehicle. The image sensors 12 may be mounted at various locations about the vehicle, such as in fenders, facias, side mirrors, roof, bumpers, panels, and the like.

The cameras 20 are configured to capture an image based on external light reflecting off of the object. Data representing the image, referred to as image data, can be sent to the image processing controller 16 that will be described further below. The images captured by the camera may be single frame images or video (e.g., multiple frames).

The LIDAR sensors 22 may each include a transmitter and a receiver. The transmitter emits light pulses toward the environment about the vehicle, and the receiver detects reflections of the emitted light pulses. Based on the amount of time it takes the emitted light pulses to be reflected back to the receiver, the LIDAR sensors 22 and associated controller can map out a three-dimensional (3D) view of the environment; the reflected light waves can be used and processed into a 3D visualization, or point cloud, of the environment. The LIDAR sensors 22 may scan the environment by rotating about an axis and detecting the reflected light pulses. Alternatively, the LIDAR sensors 22 may be fixed and have a defined field of view (FOV) defined by a pointing direction of the LIDAR sensors 22. An actuator may be provided for rotating the LIDAR sensors 22 to adjust the FOV.

The RADAR sensors 24 may be based on 24 GHz or 77 GHz frequency band, for example. In an example appropriate for the disclosure provided herein with parking or reverse maneuvering of the vehicle, the RADAR sensors 24 may be short-range radar (SRR) sensors. As compared to the long-range radar (LRR) or mid-range radar (MRR) sensors, the SRR sensors have smaller antenna size and lower interference. However, the RADAR sensors 24 may indeed incorporate MRR or LRR sensors. The RADAR sensors 24 are configured to emit radio waves toward the environment about the vehicle, and a RADAR receiver detects reflections of the emitted radio waves. Based on the reflected radio waves, the RADAR sensors 24 and associated controller can map out a three-dimensional (3D) view of the environment.

Regardless of the type of image sensor 12 utilized, the signals that are output therefrom and sent to the image processing controller 16 may be referred to as image data. The image data represents the environment detected outside of the vehicle as detected by the respective cameras 20, LIDAR sensors 22, and/or RADAR sensors 24.

The vehicle state sensors 14 may include a wheel speed sensor 26, a shift position sensor 28, and a steering angle sensor 30. In short, the wheel speed sensor 26 detects the rotation speed (wheel speed) of the driving wheel, the shift position sensor 28 detects a shift position of the transmission, and the steering angle sensor 30 detects a steering angle (for example, the direction and degree of a steering angle input by a driver) or an actual steering angle (wheel turning angle) according to the steering angle.

The shift position sensor 28 is configured to detect which gear or operating state the vehicle is in. For example, the shift position sensor 28 may be a PRNDL sensor configured to detect the vehicle being currently shifted into Park, Reverse, Neutral, Drive, or Low gears. This may be performed using mechanical switches, hall effect sensors, or other mechanisms known in the art. As will be described further below, the shift position sensor 28 may initiate the disclosed system 10 such that the system 10 is started upon the vehicle shifting into Reverse, for example, causing the overhead view (and optionally the rearward view from a rear-facing camera) to be displayed on the vehicle display 18.

The steering angle sensor 30 is configured to detect the current angle of the steering wheel within the cabin of the vehicle. The steering angle sensor 30 may be located within the steering column. The steering angle sensor 30 may include, for example, analog sensors which use voltage differences to determine information about the angle and turn direction, as well as digital sensors which use a light-emitting diode (LED) light that measures the angle of the steering input.

The image processing controller 16 may be or include an electronic control unit (ECU). The image processing controller 16 may be an electronic control circuit configured to receive data from the image sensors 12 and vehicle state sensors 14, process the data, and control the vehicle display 18. The structure shown in FIG. 1 within the image processing controller 16 is merely exemplary, and other circuits or configurations may be provided. In the illustrated embodiment, the image processing controller 16 includes an image data processor 32, a display controller 34, and memory 36. In general, the image processing controller 16 may include processor hardware (shared, dedicated, or group) such as image data processor 32 and/or display controller 34 that executes code and memory hardware (shared, dedicated, or group) such as memory 36 that stores code executed by the processor hardware. The code is configured to provide the features of the controller and systems described herein.

The image data processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 36.

The memory 36 may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The image data processor 32 may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured, upon execution by the image data processor 32, to create the environment-fixed overhead composite image described herein and cause the display controller 34 to display, on the vehicle display 18, such an image.

Via the image processing controller 16, implementations of the subject matter and the operations described herein can be implemented in digital electronic circuitry, or in computer software embodied on a tangible medium, firmware, or hardware, including the structures disclosed in this specification and their structural equivalents, or in combinations of one or more of them. Implementations of the subject matter described herein can be implemented as one or more computer programs embodied on a tangible medium, e.g., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

Via the image processing controller 16, a computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in memory 36 in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network. In other words, the image processing controller 16 may have more than a single processor 32 and/or a single controller 34, but may incorporate a network of processors or controllers communicating with one another and, for example sharing tasks.

The processes and logic flows described herein can be performed by one or more programmable processors (e.g., image data processor 32) executing one or more computer programs to perform actions by operating on input data (e.g., from image sensors 12 and/or vehicle state sensors 14) and generating output (e.g., to cause the display controller 34 to display, on the vehicle display 18, an environment-fixed overhead composite image). The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

Unless otherwise indicated herein, the structure described above as part of the image processing controller 16 can more generally be referred to as a "processor" or a "controller." For example, a processor programmed to receive image data from the image sensor 12 and cause a corresponding display to be shown on the vehicle display 18 may incorporate one or more of the appropriate structures described above.

The vehicle display 18 may be installed within the vehicle cabin, such as within the center console or as part of an infotainment system within the vehicle. The vehicle display 18 may be a human-machine interface (HMI) implemented as a touch-screen, liquid crystal display (LCD), light-emitting diode (LED) screen, or the like. The vehicle display 18 carries out various kinds of displays under the control of the image processing controller 16, and more particularly, by a display controller 34 implemented therein, to provide data to the driver in a visual manner. For example, images captured from the cameras 20 may be displayed on the vehicle display 18, as will be further explained herein. The vehicle display 18 may also be utilized by the driver to perform other in-vehicle tasks, such as climate control, entertainment control (e.g., volume, radio tuning, etc.), seat movement, and the like. The vehicle display 18 may also be a mobile device (e.g., a smart phone) communicatively connected to the vehicle and configured to control operation of the vehicle. For example, remote parking or remote operation of the vehicle can be developed in which a driver or operator can utilize such a mobile device to control movement of the vehicle; in such a case, the mobile device can be considered the vehicle display 18.

Figure 2:
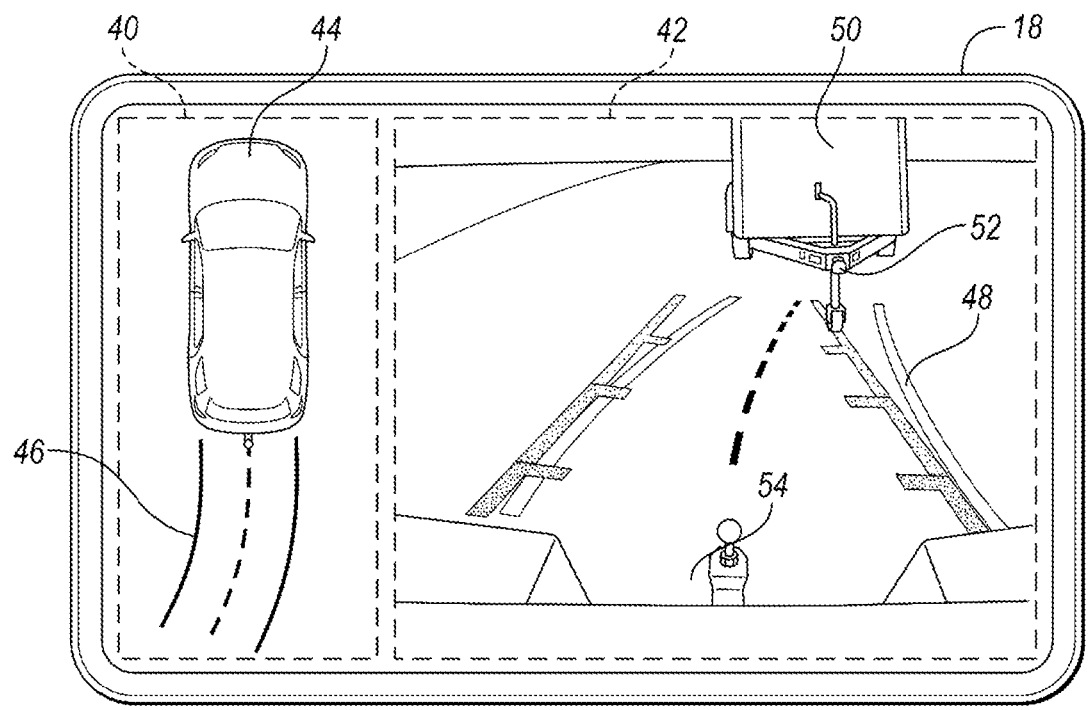
FIG. 2 is a view of a vehicle display displaying both a bird's eye view and a rear-camera view during a maneuvering event, according to an embodiment.

FIG. 2 illustrates one embodiment of the system 10 being utilized to display, on the vehicle display 18, one or more camera views of the environment about the vehicle during a reverse maneuver. In this embodiment, the left-hand side illustrates a both vehicle-fixed overhead composite image 40 as well as a rearward-view image 42 taken from a single rearward-facing camera (e.g., one of the cameras 20). The images 40, 42 may be shown simultaneously, side-by-side on the vehicle display 18. The images 40, 42 may be displayed on the vehicle display 18 in response to the vehicle being shifted into Reverse (e.g., as signaled by shift position sensor 28), or the driver pressing a park-assist button, or image sensors 12 and vehicle state sensors 14 indicating the vehicle is likely parking due to slow speeds (e.g., below 3 miles per hour) and/or objects being detected within a threshold distance.

The vehicle-fixed overhead composite image 40 can be created by stitching together images from various image sensors 12. This view can be referred to as a birds-eye view, overhead view, 360-degree view, top-down view, and the like. This shows a simulated view from above the vehicle, as if a virtual camera were placed directly above the vehicle. A graphical image 44 representing a simulated top view of the vehicle can be overlaid onto the stitched-together camera images. In the vehicle-fixed overhead composite image 40, the graphical image 44 of the vehicle is fixed at all times, while the environment about the vehicle moves due to the image sensors 12 onboard the vehicle moving as the vehicle moves.

The vehicle-fixed overhead composite image 40 may include guidelines 46, and/or the rearward-view image 42 may include guidelines 48. These guidelines 46, 48 may be overlaid onto the image produced by the respective cameras. The guidelines 46, 48 help the driver project where the vehicle will be located if it continues along the current path during reverse. The guidelines 46, 48 may be commanded to be displayed on the vehicle display 18 by the display controller 34 based on input by the steering angle sensor 30. For example, as the steering angle sensor 30 indicates changes in the current steering angle, so to can the guidelines 46, 48 bend or change direction accordingly.

As mentioned, the task of reversing can sometimes be tedious and difficult for some drivers, even with the vehicle-fixed overhead composite image 40 and the rearward-view image 42. For example, reversing the vehicle into position for attachment with a trailer can remain difficult. An example trailer 50 equipped with a coupler 52 is shown in the rearward-view image 42 of FIG. 2, as is a trailer hitch 54 of the reversing vehicle. The coupler 52 may be a ball coupler or pocket known in the art, and the vehicle's trailer hitch 54 may be a ball mount sized and configured to be received within the coupler 52 in a ball-and-socket connection. Reversing the vehicle to couple with the trailer 50 via the ball-and-socket connection may not be easy, as very precise alignment between coupler 52 and trailer hitch 54 may be required.

Therefore, an environment-fixed overhead composite image may instead be shown on the vehicle display 18 instead of the vehicle-fixed overhead composite image. An example of the vehicle display 18 showing an embodiment of the environment-fixed overhead composite image 60 is shown in FIGS. 3-4, wherein the graphical image 44 representing a top view of the vehicle is movable within the frame, and the environment about the vehicle (e.g., the road, the trailer, etc.) is fixed as the vehicle moves.

Figure 3:
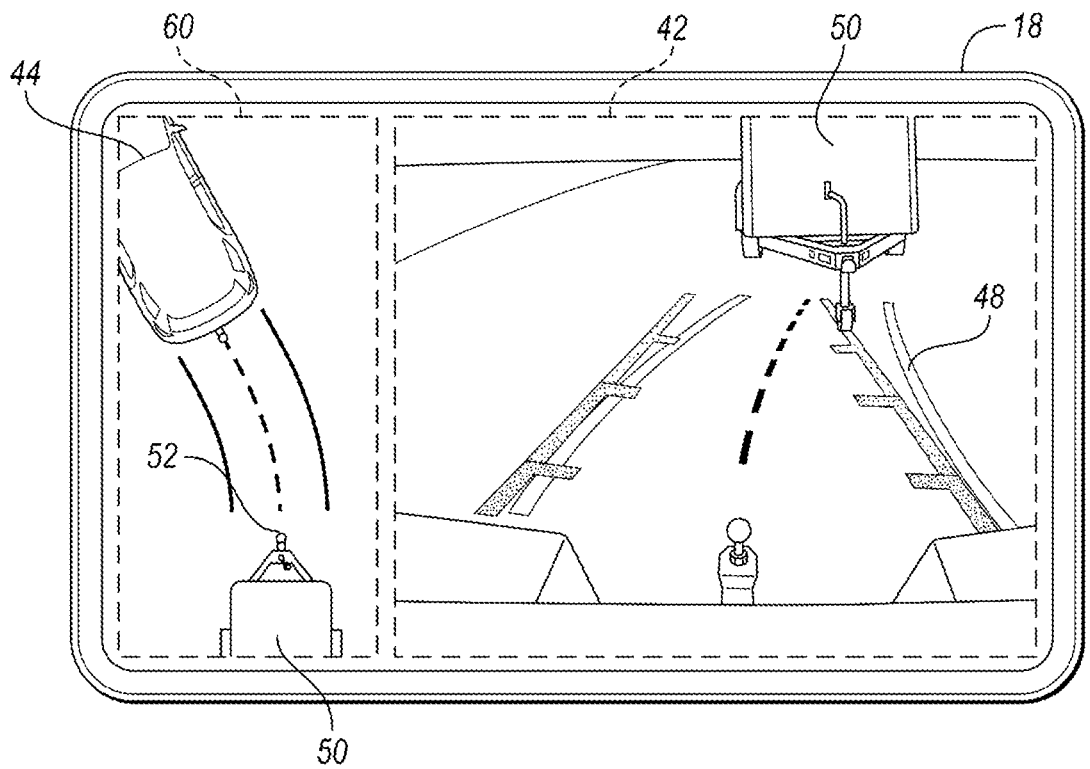
FIG. 3 is a view of a vehicle display displaying both an environment-fixed overhead composite image and a rear-camera view during a maneuvering event, according to an embodiment.
Figure 4:
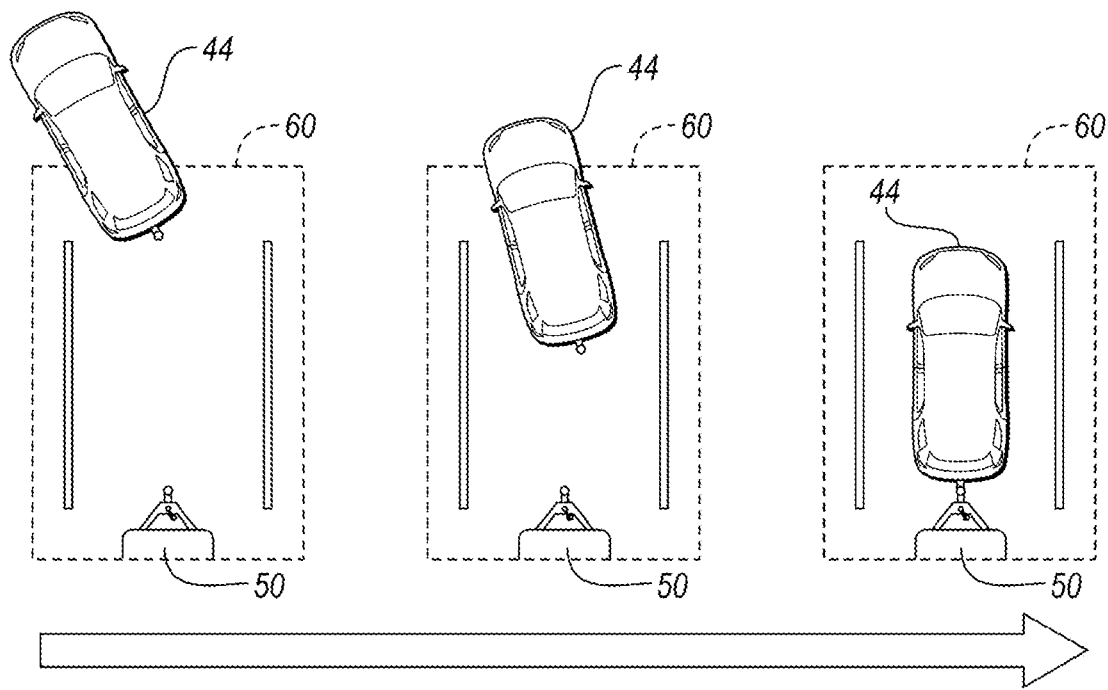
FIG. 4 is an example of the environment-fixed overhead composite image progressing over time during a maneuvering event, according to an embodiment.

FIG. 3 illustrates one embodiment of the system 10 being utilized to display, on the vehicle display 18, one or more camera views of the environment about the vehicle during a reverse maneuver. In this embodiment, the left-hand side illustrates the environment-fixed overhead composite image 60 according to one embodiment, and the right-hand side illustrates a corresponding rearward-view image 42 taken from a single rearward-facing camera (e.g., one of the cameras 20), similar to that shown in FIG. 2. The images 60, 42 may be shown simultaneously, side-by-side on the vehicle display 18. Also like in FIG. 2, the environment-fixed overhead composite image 60 may be provided with guidelines 62, and again the rearward-view image 42 may include guidelines 48.

As explained herein, within the environment-fixed overhead composite image 60 shown on the vehicle display 18, the graphical image 44 representing a top view of the vehicle is moveable, and the environment about the vehicle (such as the road and the trailer 50) are fixed. This is shown in FIG. 4, which is a time-progression view of the environment-fixed overhead composite image 60 as the driver reverses the vehicle. The boundary line of the environment-fixed overhead composite image 60 illustrates the field of view within the environment-fixed overhead composite image 60 as shown on the vehicle display 18. In other words, the items shown within the boundary lines are visible on the vehicle display 18 in the environment-fixed overhead composite image 60. As can be seen, as the driver of the vehicle reverses the vehicle toward the trailer 50, the graphical image 44 also moves within the environment-fixed overhead composite image 60; the trailer 50 remains fixed. This can help the driver better understand the positional relationship as the vehicle approaches the trailer 50.

Not only can the system 10 stitch together images from the various cameras 20 to create the environment-fixed overhead composite image 60, but the system 10 is also configured to decide the size and orientation of the display area of the environment-fixed overhead composite image 60. In other words, the relative size and orientation of the image 60 being displayed on the vehicle display 18 should be carefully calculated because the environment is fixed as the vehicle is reversing. For example, when target object is in view of the vehicle's cameras 20, the target object may be fixed at the bottom-most portion of the environment-fixed overhead composite image 60. In this example, the target object is a detected trailer, e.g., trailer 50. As will be described, the various image sensors 12 may detect the presence of a target object (e.g., trailer 50), the distance between the vehicle and the target object, and the relative position (e.g., angle) between the vehicle and the target object. The image processing controller 16 is configured to determine a fixed area of viewable environment about the vehicle to be displayed within the environment-fixed overhead composite image 60 based on this data.

Figure 5:
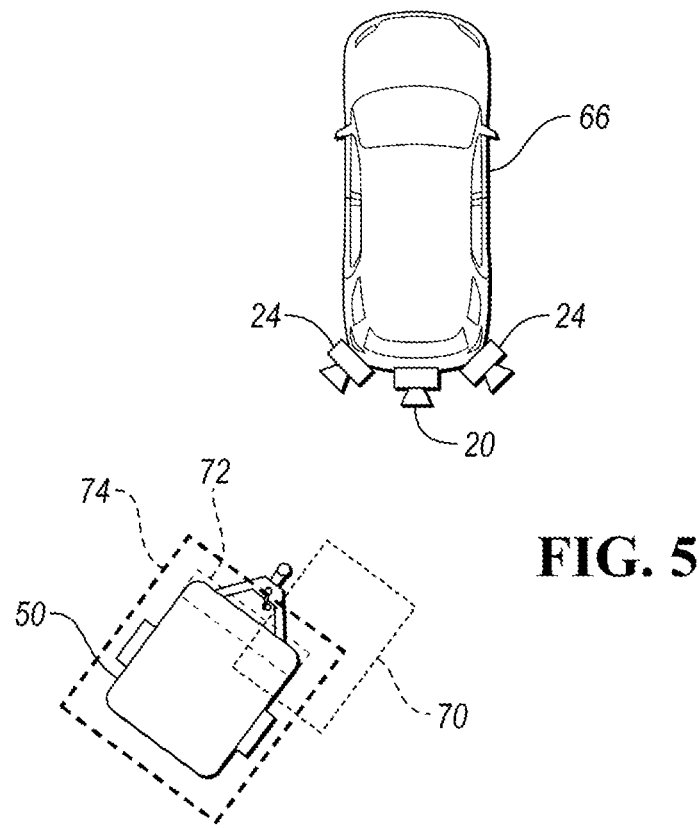
FIG. 5 is a schematic overhead view of a vehicle with image sensors for detecting a target object, according to an embodiment.

FIG. 5 illustrates a schematic overhead view of the maneuvered vehicle 66 and the trailer 50. The vehicle 66 has several image sensors 12 including one of the cameras 20 and a pair of RADAR sensors 24. The camera 20 and associated processor or controller is configured to detect a presence of a target object. In one embodiment, the image processing controller 16 is equipped with image-detecting software or a machine-learning model configured to detect and classify certain objects. The image-detecting software or machine-learning model may be a commercially-available product such as REKOGNITION by AMAZON, OPENCV, CLARIFAI, TORCH, or the like, and may be pre-trained to recognize certain target objects, such as trailers, within the field of view of the camera 20 that may be of interest for attaching to the vehicle 66.

Once a target object is identified, the camera 20 and associated processor or controller is also configured to detect a distance between the camera 20 and the identified target object, e.g., the trailer 50. However, the additional sensors such as RADAR sensors 24 may be more accurate for such measurements. While RADAR sensors 24 and associated processors or controllers may be better suited to detect distance to the identified target object, as well as the relative angle to the identified target object, the RADAR sensors 24 may not be able to detect the type of object (e.g., perform image recognition functions described above). The system 10 is therefore configured to combine the image data from the camera 20 and the RADAR sensors 24 to determine the distance and relative angle of the target object. For example, as illustrated in FIG. 5, a first boundary 70 represents the portion of the target object that is visible by the camera 20, and a second boundary 72 represents the portion of the target object that is visible by the RADAR sensors 24. A third boundary 74 represents the combined output of the camera 20 and RADAR sensors 24.

Figure 6:
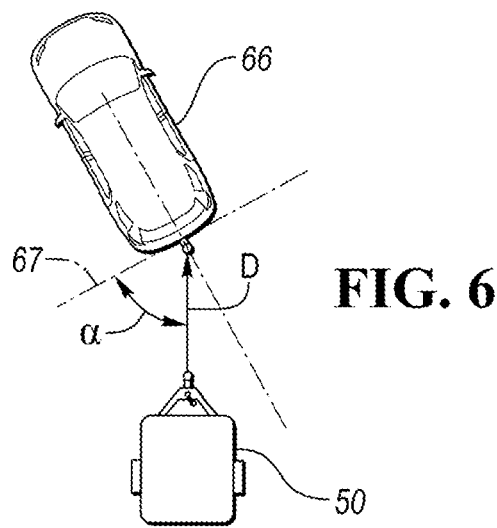
FIG. 6 is a schematic overhead view of a vehicle in relation to a target object, according to an embodiment.

Data from the camera 20 and RADAR sensors 24, and optionally LIDAR sensors 22 or the like, can be fused to create the combined output in boundary 74. Sensor fusion may be performed according to any number of known techniques. For example, a Kalman filter or Bayesian filter may be used to merge data from the various image sensors 12 and improve accuracy of the detected distance to the target object as well as the orientation of the target object. Sensor fusion may be performed according to the teachings of U.S. Pat. No. 9,390,624 which is hereby incorporated by reference in its entirety. Given these teachings, the system 10 is, in general, configured to combine the data output by the RADAR sensors 24 with the data output by the camera(s) 20 to determine a more accurate position (e.g., orientation, angle) of the target object (e.g., trailer 50), as well as a distance from the vehicle 66 to the target object. FIG. 6 illustrates an example of such computed parameters. An angle (a) represents a relative offset angle between the vehicle 66 and the target object (e.g., trailer 50). The fused data from the camera 20 and RADAR sensors 24 can determine what angle (a) the target object is relative to the vehicle. For example, the camera 20 and sensors 24 are fixed on the vehicle 66 extending along a known axis 67 fixed relative to the vehicle, the camera 20 and sensors 24 can detect a relative central axis of the target object, and the system 10 can determine the angle (a) between the known axis 67 and the determined central axis of the target object. Likewise, the distance (D) from the vehicle 66 to the target object can be determined with fused data from the various image sensors 12.

Figure 7:
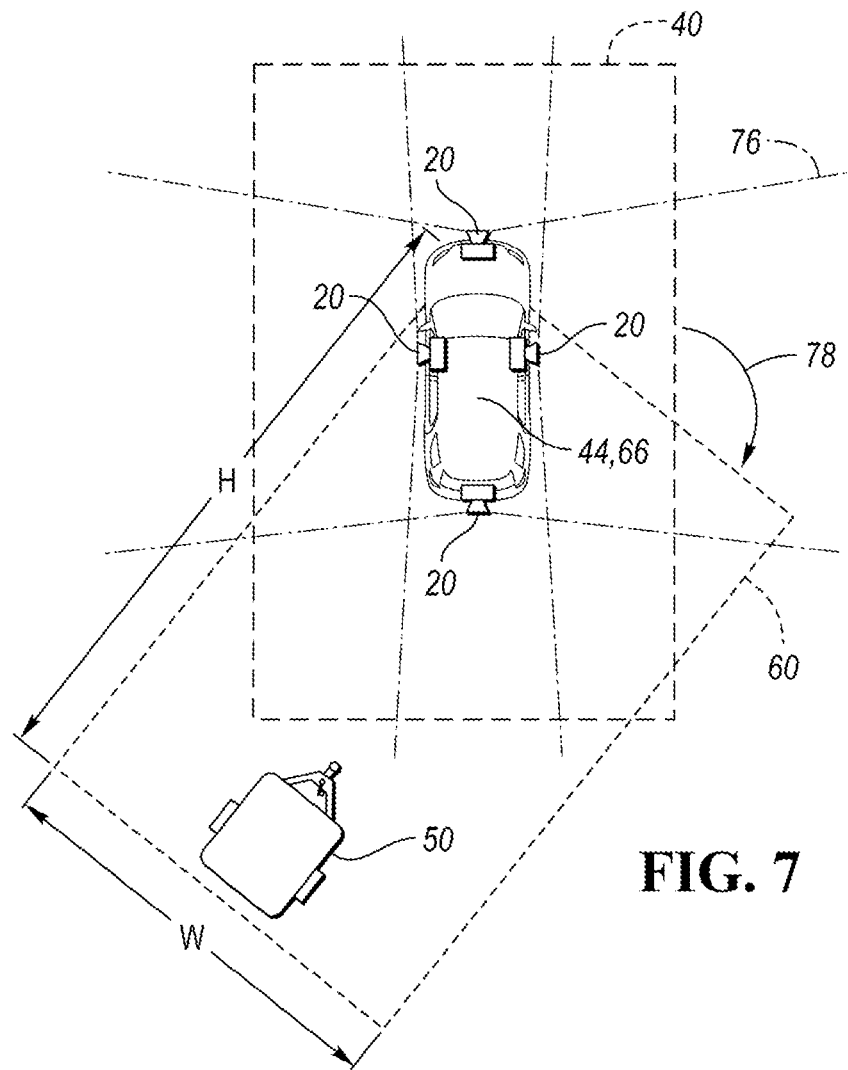
FIG. 7 is a schematic overhead view of the system creating the environment-fixed overhead composite image, according to an embodiment.

Based on the determined position (e.g., orientation, angle (a)) and/or distance (D) from the vehicle 66 to the target object (e.g., trailer 50), the system 10 can determine the size and location of the environment-fixed overhead composite image 60. FIG. 7 provides a visual illustration as to the system 10 creating the environment-fixed overhead composite image 60 from the cameras 20 that are used to create the vehicle-fixed overhead composite image 40. In particular, each camera 20 has its own respective field of view (as illustrated by dashed lines 76 emanating from each camera 20). In one embodiment, the system creates the vehicle-fixed overhead composite image 40 as described herein, and then adjusts the size, resolution, and orientation of the image to create the environment-fixed overhead composite image 60. Once the angle (a) and distance (D) are determined, the field of view for the environment-fixed overhead composite image 60 can be set and fixed with the target object (e.g., trailer 50) appearing at the bottom center of the image as shown in the vehicle display 18. (See, for example, FIGS. 3-4). The width (W) and height (H) of the field of view shown in the environment-fixed overhead composite image 60 can be adjusted such that at least a portion of the vehicle 66 (or graphical image 44 representing the vehicle) is visible within the environment-fixed overhead composite image 60 as displayed on the vehicle display 18.

In one embodiment, the environment-fixed overhead composite image 60 is a resized, turned, and relocated form of the vehicle-fixed overhead composite image 40. In particular, the vehicle-fixed overhead composite image 40 may be determined based on the teachings above, and then turned or translated (as represented by arrow 78) as a function of the angle (a) such that the target object appears at the bottom of the image (e.g., environment-fixed overhead composite image 60) in a straight-ahead orientation. The width (W) and height (H) can be adjusted such that at least a portion (or only a portion) of the graphical image 44 is visible by the driver within the environment-fixed overhead composite image 60.

Once the area of the environment-fixed overhead composite image 60 is determined, it can be set and fixed throughout the maneuvering of the vehicle 66. Therefore, as the vehicle 66 is maneuvered (e.g., reversed), the environment visible within the environment-fixed overhead composite image 60 remains spatially fixed. This may involve a constant processing of the image data (e.g., resizing and readjustment of the vehicle-fixed overhead composite image 40) as the cameras 20 onboard the vehicle 66 are moved relative to the environment as the vehicle 66 moves so that the target object remains in a fixed location on the vehicle display 18 as the vehicle 66 is maneuvered.

The image processing controller 16 can also switch the vehicle display 18 between displaying the vehicle-fixed overhead composite image 40 and the environment-fixed overhead composite image 60. For example, if one or more of the image sensors 12 (or a fused output of various image sensors 12) determine that the distance (D) between one of the image sensors (or the vehicle 66) and the target object exceeds a threshold distance, the image processing controller 16 can cause the vehicle display 18 to display the vehicle-fixed overhead composite image 40; if the determined distance (D) is less than the threshold distance, the image processing controller 16 can cause the vehicle display 18 to display the environment-fixed overhead composite image 60. The toggling between displaying vehicle-fixed overhead composite image 40 and displaying the environment-fixed overhead composite image 60 can occur as the driver is maneuvering the vehicle 66. In another embodiment, once the vehicle display 18 is showing either one of the vehicle-fixed overhead composite image 40 or the environment-fixed overhead composite image 60, that image is maintained on the vehicle display 18 until the vehicle 66 is no longer in Reverse or otherwise exits the system.

Figure 8:
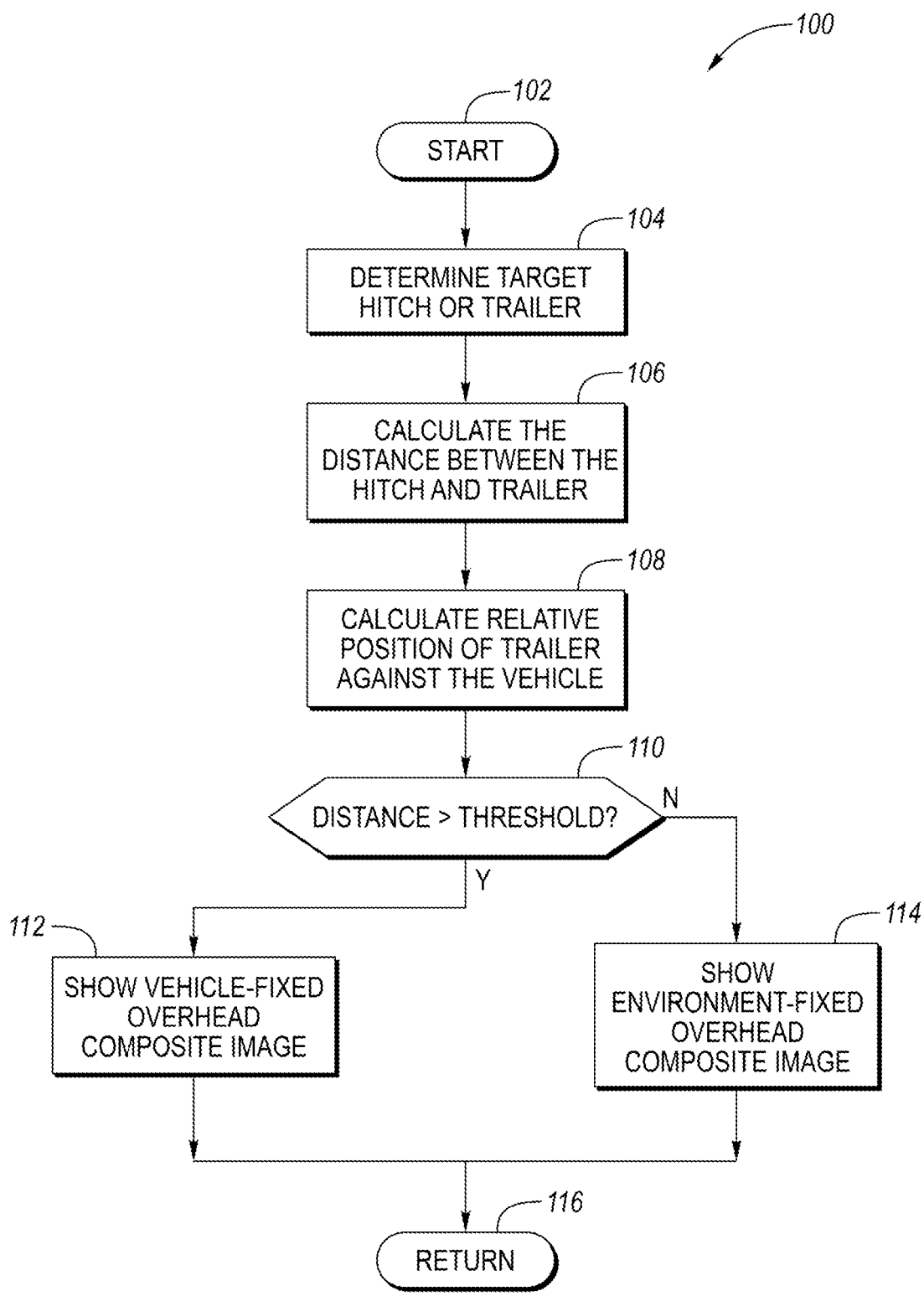
FIG. 8 illustrates a method or algorithm employed by the system for assisting a driver to maneuver a vehicle, according to an embodiment.

FIG. 8 illustrates an algorithm 100 that can be implemented by the image processing controller 16, for example. In embodiments, the instructions to perform such an algorithm can be stored in memory 36 and accessed by at least one processor (e.g., image data processor 32 and/or display controller 34, or another processor) for performance. The algorithm 100 starts at 102. The starting of the algorithm 100 may initiate in response to the vehicle being shifted into Reverse as indicated by the shift position sensor 28, or manually entered by the driver, or the like as explained above.

At 104, one or more of the image sensors 12 (e.g., cameras 20) and an associated processor (e.g., image data processor 32) detect a target object such as a hitch or trailer is in the field of view. This may be performed via image recognition software discussed above. At 106, one or more of the processors analyzes image data from the image sensors 12 to determine the distance (D) to the detected target object, via the methods described above for example. In an embodiment, one or more RADAR sensors 24 determines the distance to the target object. In an embodiment, a camera 20 determines a distance to the target object, and that determined distance is modified or enhanced based on a distance reading from one or more of the RADAR sensors 24.

At 108, the image processing controller 16 or an associated processor therein determines a position of the target object relative to the vehicle. For example, the angle (a) may be determined based, representing the angle of the target object relative to the vehicle, as described above.

At 110, the image processing controller 16 compares the determined distance (D) with a threshold. The threshold may be, for example, 10 feet. This threshold can be set by the driver at the vehicle (e.g., via the HMI at the vehicle display 18). Alternatively, this threshold can be set by the manufacturer of the vehicle 66. If the detected distance (D) exceeds the threshold, the algorithm proceeds to 112 and shows the vehicle-fixed overhead composite image 40 on the vehicle display 18. If the detected distance (D) does not exceed the threshold, the algorithm proceeds to 114 and shows the environment-fixed overhead composite image 60 on the vehicle display 18.

The algorithm then returns at 116 to the start 102. This can enable a continuous comparison of the distance to the threshold at 110 so that the vehicle display 18 can switch between the vehicle-fixed overhead composite image 40 and the environment-fixed overhead composite image 60 during a maneuvering event.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for assisting a driver to maneuver a vehicle, the system comprising:
   a plurality of image sensors configured to mount at various locations about a vehicle, wherein at least some of the image sensors are cameras, and wherein the image sensors are configured to output image data;
   a vehicle display; and
   at least one processor programmed to:
   receive image data from the cameras,
   utilize a first of the image sensors to determine a distance between the first of the image sensors and a target object external to the vehicle,
   generate an environment-fixed overhead composite image on the vehicle display representing a first overhead view of an environment about the vehicle wherein the environment displayed on the vehicle display is spatially fixed as the vehicle is maneuvered and a graphical image representing the vehicle is configured to move within the environment-fixed overhead composite image as the vehicle maneuvered,
   generate a vehicle-fixed overhead composite image on the vehicle display representing a second overhead view of the environment about the vehicle wherein the environment displayed on the vehicle display is spatially moveable as the vehicle is maneuvered and the graphical image representing the vehicle is fixed within the vehicle-fixed overhead composite image as the vehicle is maneuvered,
   determine a size and orientation of a fixed display field of view of the environment-fixed overhead composite image based on the distance, wherein the size of the fixed display field of view remains fixed as the vehicle is maneuvered, and
   switch the vehicle display between displaying the vehicle-fixed overhead composite image and the environment-fixed overhead composite image based on the distance.

2. The system of claim 1, wherein the at least one processor is further programmed to:
   switch the vehicle display from displaying the vehicle-fixed overhead composite image to displaying the environment-fixed overhead composite image in response to the distance dropping below a threshold.

3. The system of claim 1, wherein the at least one processor is further programmed to:
   generate the environment-fixed overhead composite image or the vehicle-fixed overhead composite image in response to the vehicle being placed in reverse.

4. The system of claim 1, wherein the at least one processor is further programmed to:
   determine a location of the target object based on the image data, and determine the size and orientation of the fixed display field of view of the environment-fixed overhead composite image further based on the location of the target object.

5. The system of claim 4, wherein the at least one processor is further programmed to:
determine the size and orientation of the display field of view of the environment-fixed overhead composite image such that at least a portion of the target object is visible at a bottom of the environment-fixed overhead composite image.

6. The system of claim 4, wherein the at least one processor is further programmed to:
determine the size and orientation of the display field of view of the environment-fixed overhead composite image based on a relative angle of orientation of the target object relative to the vehicle.

7. A system for assisting a driver to maneuver a vehicle, the system comprising:
a plurality of image sensors configured to mount at various locations about a vehicle, wherein at least some of the image sensors are cameras, and wherein the image sensors are configured to output image data;
a vehicle display; and
at least one processor programmed to:
receive image data from the cameras,
utilize a first of the image sensors to determine a distance between the first of the image sensors and a target object external to the vehicle, and
in response to the distance being less than a threshold, utilize the image data to generate an environment-fixed overhead composite image on the vehicle display representing an overhead view of an environment about the vehicle, determine a size and orientation of a fixed display field of view of the environment-fixed overhead composite image based on the distance, wherein the size of the fixed display field of view remains fixed as the vehicle is maneuvered, wherein the environment displayed within the environment-fixed overhead composite image is spatially fixed as the vehicle is maneuvered and a graphical image representing the vehicle is configured to move within the environment-fixed overhead composite image as the vehicle maneuvered.

8. The system of claim 7, wherein the at least one processor is further programmed to:
in response to the distance exceeding the threshold, utilize the image data to generate a vehicle-fixed overhead composite image on the vehicle display representing a second overhead view of the environment about the vehicle wherein the environment displayed within the vehicle-fixed overhead composite image is spatially moveable as the vehicle moves and the graphical image representing the vehicle is fixed within the vehicle-fixed overhead composite image as the vehicle maneuvered.

9. The system of claim 8, wherein the at least one processor is further programmed to:
generate the environment-fixed overhead composite image or the vehicle-fixed overhead composite image in response to the vehicle being placed in reverse.

10. The system of claim 8, wherein the at least one processor is further programmed to: switch the vehicle display from displaying the vehicle-fixed overhead composite image to displaying the environment-fixed overhead composite image in response to the distance going from exceeding the threshold to being less than the threshold.

11. The system of claim 7, wherein the at least one processor is further programmed to:
determine a location of the target object based on the image data, and
determine the size and orientation of the display field of view of the environment-fixed overhead composite image further based on the location of the target object.

12. The system of claim 11, wherein the at least one processor is further programmed to:
determine the size and orientation display field of view of the environment-fixed overhead composite image such that at least a portion of the target object is visible at a bottom of the environment-fixed overhead composite image.

13. A method of assisting a driver to maneuver a vehicle, the method comprising:
receiving image data from a plurality of image sensors mounted about a vehicle, wherein at least some of the image sensors are cameras; and
determining a distance between one of the image sensors and a target object external to the vehicle;
based on the image data, and in response to the distance reducing below a threshold, generating an environment-fixed overhead composite image on a vehicle display representing an overhead view of an environment about the vehicle, wherein within the environment-fixed overhead composite image the environment is spatially fixed as the vehicle is maneuvered and a graphical image representing the vehicle is configured to move within the environment-fixed overhead composite image as the vehicle maneuvered; and
determine a size and orientation of a fixed display field of view of the environment-fixed overhead composite image based on the distance and a location of the object, wherein the size of the fixed display field of view remains fixed as the vehicle is maneuvered.

14. The method of claim 13, further comprising:
generating a vehicle-fixed overhead composite image on the vehicle display representing a second overhead view of the environment about the vehicle wherein the environment displayed on the vehicle display is spatially moveable as the vehicle is maneuvered and the graphical image representing the vehicle is fixed within the vehicle-fixed overhead composite image as the vehicle is maneuvered.

15. The method of claim 14, further comprising:
switching the vehicle display from displaying the vehicle-fixed overhead composite image to displaying the environment-fixed overhead composite image in response to the distance reducing below the threshold.

* * * * *